(12) United States Patent
Chen et al.

(10) Patent No.: US 11,219,859 B2
(45) Date of Patent: Jan. 11, 2022

(54) SUPPORTED CATALYST, MONOLITHIC SELECTIVE CATALYTIC REDUCTION (SCR) CATALYST, PREPARATION METHOD THEREFOR, AND METHOD FOR NITROGEN OXIDES REMOVAL

(71) Applicant: BASF Corporation, Florham Park, NJ (US)

(72) Inventors: Liang Chen, Shanghai (CN); Feng Zhao, Shanghai (CN); Jia Di Zhang, Shanghai (CN); An Ju Shi, Shanghai (CN); Shau-Lin Frank Chen, Shanghai (CN); Miao Mark Chen, Shanghai (CN)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 16/320,708

(22) PCT Filed: Jul. 26, 2016

(86) PCT No.: PCT/CN2016/091691
§ 371 (c)(1),
(2) Date: Jan. 25, 2019

(87) PCT Pub. No.: WO2018/018406
PCT Pub. Date: Feb. 1, 2018

(65) Prior Publication Data
US 2019/0160428 A1    May 30, 2019

(51) Int. Cl.
*B01J 21/04*    (2006.01)
*B01J 21/06*    (2006.01)
(Continued)

(52) U.S. Cl.
CPC .......... *B01D 53/9418* (2013.01); *B01J 23/22* (2013.01); *B01J 35/002* (2013.01);
(Continued)

(58) Field of Classification Search
CPC . B01J 21/04; B01J 21/06; B01J 21/063; B01J 21/066; B01J 21/08; B01J 23/18;
(Continued)

(56) References Cited

U.S. PATENT DOCUMENTS 3,243,385 A * 3/1966 Ohorodnik ............ C07C 255/00
502/209
3,346,659 A * 10/1967 Gasson .................... B01J 21/00
585/626
(Continued)

FOREIGN PATENT DOCUMENTS

CN    101947443    1/2011
CN    105233675    1/2016
(Continued)

OTHER PUBLICATIONS

Lee et al., "Enhanced Activity of Ceria Loaded Sb—$V_2O_5/TiO_2$ Catalysts for NO Reduction with Ammonia," *Catalysis Letters*, 2013, vol. 143, No. 10, pp. 988-995.
(Continued)

*Primary Examiner* — Cam N. Nguyen
(74) *Attorney, Agent, or Firm* — Finnegan, Henderson, Farabow, Garrett & Dunner, LLP

(57) ABSTRACT

The present disclosure relates to a catalyst for NOx removal. In some embodiments, the catalyst comprises a support comprising at least one selected from the group consisting of $TiO_2$, $Al_2O_3$, $SiO_2$, $ZrO_2$, $CeO_2$, zeolite, $TiO_2$ and $WO_3$, and combinations thereof, and catalytically active components supported on the support. The catalytically active components comprise vanadium, antimony and at least one further
(Continued)

component selected from the group consisting of silicon, aluminum and zirconium.

29 Claims, 1 Drawing Sheet

(51) Int. Cl.
   *B01J 21/08*    (2006.01)
   *B01J 21/12*    (2006.01)
   *B01J 23/18*    (2006.01)
   *B01J 23/22*    (2006.01)
   *B01J 23/30*    (2006.01)
   *B01J 35/00*    (2006.01)
   *B01J 37/08*    (2006.01)
   *B01J 37/20*    (2006.01)
   *B01D 53/94*    (2006.01)

(52) U.S. Cl.
   CPC ......... *B01J 35/0073* (2013.01); *B01J 37/08* (2013.01); *B01J 37/20* (2013.01); *B01D 2251/2062* (2013.01); *B01D 2255/2092* (2013.01); *B01D 2255/2098* (2013.01); *B01D 2255/20715* (2013.01); *B01D 2255/20723* (2013.01); *B01D 2255/30* (2013.01); *B01D 2257/402* (2013.01); *B01D 2257/404* (2013.01); *B01D 2258/012* (2013.01); *B01J 2523/31* (2013.01); *B01J 2523/41* (2013.01); *B01J 2523/48* (2013.01); *B01J 2523/53* (2013.01); *B01J 2523/55* (2013.01)

(58) Field of Classification Search
   CPC . B01J 23/22; B01J 35/002; B01J 21/12; B01J 23/30; B01J 37/08; B01J 37/20; B01J 35/0073; B01D 53/9418
   See application file for complete search history.

(56) References Cited

U.S. PATENT DOCUMENTS

| | | | | |
|---|---|---|---|---|
| 3,456,002 | A * | 7/1969 | Komuro | B01J 23/22 562/535 |
| 3,562,185 | A * | 2/1971 | Poehler et al. | B01J 27/188 502/242 |
| 3,565,829 | A * | 2/1971 | Friedrichsen et al. | B01J 23/22 502/344 |
| 3,579,574 | A * | 5/1971 | van der Meer | B01J 23/18 562/534 |
| 3,830,754 | A * | 8/1974 | Ball | B01J 23/22 502/242 |
| 4,075,231 | A * | 2/1978 | Dolhyj | B01J 23/22 502/204 |
| 4,151,182 | A * | 4/1979 | Engelbach | B01J 23/22 502/202 |
| 4,339,598 | A * | 7/1982 | Guttmann | B01J 23/22 502/247 |
| 4,508,848 | A * | 4/1985 | Dolhyj | B01J 23/22 502/239 |
| 4,769,355 | A * | 9/1988 | Glaeser | B01J 23/002 502/202 |
| 4,788,317 | A * | 11/1988 | Guttmann | B01J 23/30 423/376 |
| 4,939,260 | A * | 7/1990 | Inoue | B01J 21/063 546/286 |
| 5,225,574 | A * | 7/1993 | Aichinger | B01J 23/002 549/247 |
| 5,498,588 | A | 3/1996 | Brazdil et al. | |
| 5,658,844 | A * | 8/1997 | Hippel | B01J 23/18 502/243 |
| 5,739,392 | A | 4/1998 | Tanimoto et al. | |
| 5,747,411 | A * | 5/1998 | Karrer | B01J 23/18 502/353 |
| 5,892,049 | A * | 4/1999 | Hippel | C07D 213/84 546/286 |
| 5,952,262 | A * | 9/1999 | Karrer | B01J 23/22 502/353 |
| 6,288,273 | B1 * | 9/2001 | Heidemann | B01J 23/22 502/104 |
| 6,458,970 | B1 * | 10/2002 | Hefele | B01J 23/22 502/209 |
| 6,586,361 | B1 * | 7/2003 | Heidemann | B01J 27/198 502/353 |
| 6,710,011 | B2 * | 3/2004 | Mamedov | B01J 23/002 502/353 |
| 7,592,293 | B2 * | 9/2009 | Guckel | C07C 51/265 502/350 |
| 7,608,719 | B2 * | 10/2009 | Verma | B01J 23/002 546/286 |
| 8,716,172 | B2 * | 5/2014 | Schermanz | B01J 23/30 502/312 |
| 9,211,526 | B2 * | 12/2015 | Auer | C01G 41/02 |
| 9,579,603 | B2 * | 2/2017 | Sonntag | B01D 53/8628 |
| 2010/0105940 | A1 * | 4/2010 | Huber | C07C 253/28 558/311 |
| 2013/0040808 | A1 | 2/2013 | Schermanz et al. | |

FOREIGN PATENT DOCUMENTS

| | | |
|---|---|---|
| EP | 2875863 | 5/2015 |
| JP | 2005-342710 A | 12/2005 |
| RU | 2515727 | 5/2014 |
| RU | 2586685 | 6/2016 |
| WO | WO 2015/075083 | 5/2015 |

OTHER PUBLICATIONS

Phil et al., "SO$_2$ Resistant Antimony Promoted V$_2$O$_5$/TiO$_2$ Catalyst for NH$_3$—SCR of NO$_x$ at Low Temperatures," *Applied Catalysis B: Environmental*, 2008, vol. 78, No. 3-4, pp. 301-308.

* cited by examiner

SUPPORTED CATALYST, MONOLITHIC SELECTIVE CATALYTIC REDUCTION (SCR) CATALYST, PREPARATION METHOD THEREFOR, AND METHOD FOR NITROGEN OXIDES REMOVAL

CROSS-REFERENCE TO RELATED APPLICATIONS

The present application is a U.S. National Stage of International Patent Application PCT/CN2016/091691 filed Jul. 26, 2016. The disclosure of which is referenced herein in its entirety.

TECHNICAL FIELD

Generally, the present invention relates to a catalyst for NOx removal. More specifically, the present invention relates to a supported catalyst, a monolithic selective catalytic reduction (SCR) catalyst, preparation method therefor, and method for NOx removal.

BACKGROUND ART $NO_x$ is one of the main exhaust gases of mobile source and stationary source which would be harmful to environment and human beings. In order to remove NOx from exhaust gases, catalytic reducing methods have heretofore been developed. The catalytic reducing methods are suitable for dealing with large quantities of exhaust gases, and of these, a process comprising adding ammonia as a reducing agent to catalytically reduce NOx selectively to $N_2$ was reported to be superior. The catalysts used in such selective catalytic reduction (SCR) are required to reduce NOx over a broad temperature range and especially at as low a temperature as possible below 300° C. SCR activity of these catalysts should not decrease dramatically after long-term hydrothermal and sulfur aging.

EP 787521 describes the preparation of several V-containing catalysts based on $TiO_2/WO_3$ containing additional dopants such as $Y_2O_3$, $B_2O_3$, PbO, $SnO_2$, wherein the vanadium is present as vanadium pentoxide ($V_2O_5$) is described.

U.S. Pat. No. 4,221,768 describes $V_2O_5$ containing materials based on $TiO_2$ as a support material and additional oxides out of transition metals as dopants.

U.S. Pat. No. 4,466,947 describes vanadium containing denitration catalysts in which the vanadium is present in the form of an oxide or a sulfate.

US 2009/0143225A1 discloses a SCR catalyst composition having improved $NO_x$ conversion at low temperature, which comprises V and Sb on a $TiO_2$ containing support.

CN 101862651A discloses that Nb addition in $V_2O_5$—$Sb_2O_3/TiO_2$ system is beneficial to $NO_x$ conversion.

In spite of these prior art, there is still a need for SCR catalyst that exhibits excellent activity in fresh and aged state for the NOx abatement in mobile and stationary exhaust gas emission applications.

SUMMARY OF THE INVENTION

An object of the present invention is to provide a novel SCR catalyst with improved NOx abatement, especially at low temperature, e.g., below about 300° C. The object can be achieved by a supported catalyst and a method for the preparation thereof, a monolithic selective catalytic reduction catalyst and a method for the preparation thereof, a monolithic selective catalytic reduction catalyst obtainable via the inventive process, a method for reducing NOx in exhaust gas from an internal combustion engine by using the inventive catalysts, and a method for treatment of emission gas generated from power plant by using the inventive catalysts.

In a first aspect of the invention, there provided a supported catalyst, which comprises
a support, and
catalytically active components supported on the support, which comprise vanadium, antimony and at least one further component selected from the group consisting of silicon, aluminum and zirconium.

In a second aspect of the invention, there provided a process for preparing the supported catalyst of the invention in the first aspect, which includes the steps of:
providing the support; and
supporting the catalytically active components onto the support.

In a third aspect of the invention, there provided a monolithic selective catalytic reduction (SCR) catalyst, which comprises:
a monolithic substrate, and
a catalytic coating layer on the monolithic substrate, wherein the catalytic coating layer comprises the supported catalyst of the invention in the first aspect.

In a fourth aspect of the invention, there provided a process for preparing the monolithic selective catalytic reduction (SCR) catalyst of the invention in the third aspect, which includes the steps of:
1) providing a slurry comprising particles of the support, precursors of vanadium oxides, antimony oxides and oxides of the at least one further component selected from the group consisting of silicon, aluminum and zirconium,
2) coating the slurry onto the monolithic substrate to obtain a coated monolithic substrate, and
3) drying and calcining the coated monolithic substrate obtained in step 2).

In a fifth aspect of the invention, there provided a monolithic selective catalytic reduction catalyst obtainable via the process of invention in the fourth aspect.

In a sixth aspect of the invention, there provided a method for reducing NOx in exhaust gas from an internal combustion engine, comprising contacting the exhaust gas with the supported catalysts of the invention in the first aspect or with the monolithic selective catalytic reduction catalysts of the invention in the third or fifth aspect.

In a seventh aspect of the invention, there provided a method for treatment of emission gas generated from power plant, comprising exposing the emission gas to the supported catalysts of the invention in the first aspect or with the monolithic selective catalytic reduction catalysts of the invention in the third or fifth aspect.

The inventive catalysts exhibit high catalytic performance for NOx abatement in a broader temperature range, e.g., between 150° C. to 650° C., or between 180 to 600° C., or 200 to 550° C., in both fresh and aged state.

BRIEF OF THE DRAWINGS

DETAILED DESCRIPTION OF THE INVENTION

<Supported Catalyst>

Figure 1:
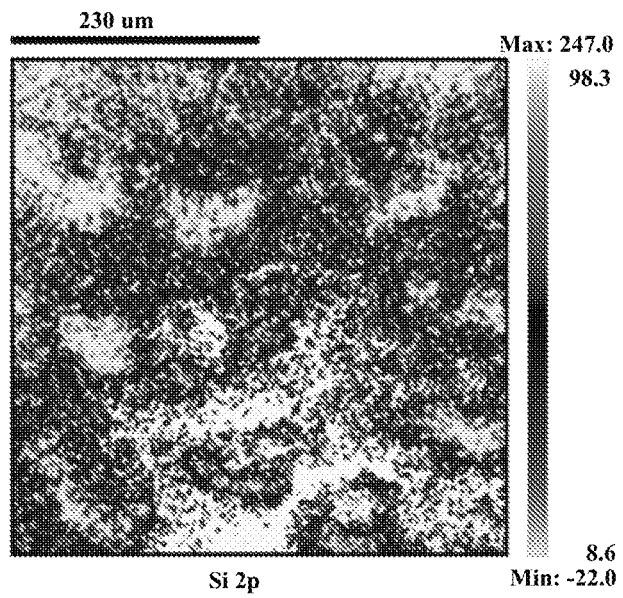
FIG. 1 is an XPS image of the inventive catalyst wherein $SiO_2$ is supported as one of the active components on $TiO_2$ support.

The first aspect of the invention relates to supported catalyst for NOx reduction, comprising:
a support, and
catalytically active components supported on the support, which comprise vanadium, antimony and at least one further component selected from the group consisting of silicon, aluminum and zirconium.

The support that can be used in the inventive supported catalyst may be any support known in the art. In one embodiment, the support comprise at least one selected from the group consisting of $TiO_2$, $Al_2O_3$, $SiO_2$, $ZrO_2$, $CeO_2$, zeolite and the combination thereof at any ratio. Preferably, the support contains $TiO_2$. Any $TiO_2$ which is known in the art suitable as catalyst support can be used in the support of the inventive catalyst. In one embodiment, $TiO_2$ used in the inventive catalyst is in form of anatase. $TiO_2$ that can be used in the invention may be commercially available, and may be prepared via conventional methods known in the art.

In one embodiment, the support consists of $TiO_2$. In another embodiment, the support consists of $TiO_2$ and $SiO_2$. In another embodiment, the support consists of $TiO_2$ and $WO_3$. In another embodiment, the support consists of $TiO_2$, $SiO_2$ and $WO_3$.

The inventive supported catalyst comprises catalytically active components, which are supported on the support as described above. The catalytically active components comprise vanadium, antimony and at least one further component selected from the group consisting of silicon, aluminum and zirconium. Inclusion of antimony as one of the active components can increase the conversion of NOx at low temperature, and inclusion of the at least one further component selected from the group consisting of silicon, aluminum and zirconium may further improve the property of the inventive catalyst, especially at low temperature, e.g., at about 200 to 300° C.

In a preferred embodiment, the catalytically active components comprise vanadium, antimony, and any one of silicon, aluminum and zirconium. More preferably, the catalytically active components consist of vanadium, antimony, and any one of silicon, aluminum and zirconium.

More preferably, the catalytically active components consist of vanadium, antimony and silicon. In this case, regardless of inclusion of silicon in the support, there must be silicon supported as one of the active components.

In one embodiment of the invention, the catalytically active components are in form of oxides of each of the individual components, or in form of composite of two or more of the components. For example, in case of comprising vanadium, antimony and silicon, the catalytically active components may be in form of vanadium oxides, antimony oxides and silicon oxide, or may be in form of composite oxides of vanadium and antimony plus silicon oxide, or may be in form of composite oxides of vanadium, antimony and silicon.

In a further preferred embodiment, the supported catalyst consists of $TiO_2$ as the support, and vanadium oxides, antimony oxides and silicon dioxide as the catalytically active components.

The support may be present in the catalyst in an amount of 50 to 97.5% by weight, preferably 61 to 93%, and more preferably 73 to 88%.

Unless mentioned otherwise in the context, the contents of the support or the catalytically active components in each case are calculated relative to the weight of the support plus the catalytically active components. Unless mentioned otherwise in the context, the content of vanadium in the inventive catalyst is calculated as $V_2O_5$, and the content of the antimony is calculated as $Sb_2O_3$.

The content of vanadium is preferably in the range of 1 to 10% by weight, more preferably 2 to 8% by weight, and more preferably 3 to 7% by weight. The content of antimony is preferably in the range of 1 to 20% by weight, more preferably 4 to 16% by weight, and more preferably 7 to 12% by weight; and the content of the at least one further component is preferably in the range of 0.5 to 20% by weight, preferably 1 to 15% by weight, more preferably 2 to 10% by weight, calculated as $SiO_2$, $Al_2O_3$ or $ZrO_2$, respectively.

In a preferred embodiment, the at least one further component is enriched on the surface and/or at the vicinity of the surface of the support. The dispersion of the at least one further component may be confirmed by, e.g., XPS analysis.

<Process for Preparing the Supported Catalyst>

The second aspect of the present invention relates to a process for preparing the inventive supported catalyst.

The supported catalyst may be prepared by a method including the steps of: providing the support as described above; and supporting the catalytically active components as described above onto the support.

The step of supporting the catalytically active components onto the support may be carried out by any method known in the art for such purpose.

A preferred process thus includes the steps of:
i) providing a solution or a slurry comprising precursors of the vanadium oxides, antimony oxides and oxides of the at least one further component selected from the group consisting of silicon, aluminum and zirconium,
ii) mixing the solution or the slurry with the support to obtain a mixture,
iii) drying the mixture obtained in step ii), and
iv) calcining the dried mixture obtained in step iii).

In said preferred preparation process, preferably, the calcination is conducted under a temperature in the range of 300° C. to 850° C., more preferably in the range of 350° C. to 650° C.

In the context of the invention, the precursors of vanadium oxides, antimony oxides and oxides of the at least one further component selected from the group consisting of silicon, aluminum and zirconium are intended to mean the compounds that can be converted by calcination under oxidizing conditions or otherwise to vanadium oxides, antimony oxides and oxides of the at least one further component, respectively, subsequently in the process.

The precursor of the vanadium oxides is preferably selected from the group consisting of ammonium vanadate, vanadyl oxalate, vanadium pentoxide, vanadium monoethanolamine, vanadium chloride, vanadium trichloride oxide, vanadyl sulfate and vanadium antimonate.

The precursor of the antimony oxides is preferably selected from the group consisting of antimony acetate, ethylene glycol antimony, antimony sulfate, antimony nitrate, antimony chloride, antimonous sulfide, antimony oxide and antimony vanadate.

<Monolithic Selective Catalytic Reduction (SCR) Catalyst>

The third aspect of the present invention relates to a monolithic selective catalytic reduction (SCR) catalyst, comprising:
a monolithic substrate, and a catalytic coating layer on the monolithic substrate, wherein the catalytic coating layer comprises the supported catalyst of the present invention.

The inventive monolithic SCR catalyst contains the supported catalyst of the present invention, which is disposed in form of layer on the monolithic substrate. Thus the description above as to the supported catalyst definitely applies to the monolithic SCR catalyst.

The substrate may be any of those materials typically used for preparing catalysts, and will preferably comprise a ceramic or metal honeycomb structure. Any suitable substrate may be employed, such as a monolithic substrate of the type having fine, parallel gas flow passages extending there through from an inlet or an outlet face of the substrate. The passages, which are essentially straight paths from their fluid inlet to their fluid outlet, are defined by walls on which the supported catalyst is coated as a washcoat so that the gases flowing through the passages contact the supported catalyst. The flow passages of the monolithic substrate are thin-walled channels, which can be of any suitable cross-sectional shape and size such as trapezoidal, rectangular, square, sinusoidal, hexagonal, oval, circular, etc.

Such monolithic substrates may contain up to about 900 or more flow passages (or "cells") per square inch of cross section, although far fewer may be used. For example, the substrate may have from about 50 to 600, more usually from about 200 to 400, cells per square inch ("cpsi"). The cells can have cross sections that are rectangular, square, circular, oval, triangular, hexagonal, or are of other polygonal shapes.

A suitable ceramic substrate may be made of any suitable refractory material, e.g., cordierite, cordierite-alumina, silicon nitride, silicon carbide, zircon mullite, spodumene, alumina-silica magnesia, zircon silicate, sillimanite, magnesium silicates, zircon, petalite, alumina, aluminosilicates and the like.

In an embodiment of the inventive monolithic SCR catalyst, the monolithic substrate is in the shape of honeycomb, corrugated plate, foils, plate or combination thereof, preferably a honeycomb cordierite substrate.

Preferably, the catalytic coating layer may be loaded in an amount of 1-10 $g/in^3$, and preferably 1-7 $g/in^3$, and more preferably 2-5.5 $g/in^3$.

<Process for Preparing the SCR Catalyst>

The fourth aspect of the present invention relates to a process for preparing the monolithic SCR catalyst of the invention described in the third aspect, which process includes the steps of:

1) providing a slurry comprising particles of the support, precursors of vanadium oxides, antimony oxides and oxides of the at least one further component selected from the group consisting of silicon, aluminum and zirconium, 2) coating the slurry onto the monolithic substrate to obtain a coated monolithic substrate, and 3) drying and calcining the coated monolithic substrate obtained in step 2).

The description above as to the precursors used in the process for preparing the inventive supported catalyst applies to the process for preparing the inventive SCR catalyst. Specifically, the precursor of the vanadium oxides may be selected from the group consisting of ammonium vanadate, vanadyl oxalate, vanadium pentoxide, vanadium monoethanolamine, vanadium chloride, vanadium trichloride oxide, vanadyl sulfate and vanadium antimonite; the antimony precursor may be selected from the group consisting of antimony acetate, ethylene glycol antimony, antimony sulfate, antimony nitrate, antimony chloride, antimonous sulfide, antimony oxide and antimony vanadate.

Likewise, the description above as to the support used in the supported catalyst and in the process for preparing the inventive supported catalyst applies to the process for preparing the inventive SCR catalyst.

Likewise, the description above as to the monolithic substrates applies to the inventive process.

Preferably, the catalytic coating layer may be loaded in an amount of 1-10 $g/in^3$, and preferably 1-7 $g/in^3$, and more preferably 2-5.5 $g/in^3$.

The solvent for the slurry may be any suitable solvent known in the art. In one embodiment, the solvent comprises water. Preferably, DI water is used as the solvent to solve or disperse the support, the precursors of the active components and etc. therein.

The slurry may comprise one or more conventional additives, e.g., disperser and precipitator. Such disperser and precipitator are well known in the art. For example, as the disperser, there can be mentioned tris (ethyhexyl) phosphate, lauryl sodium sulfate, alcohol, polyacrylamide, polyethylene glycol, ethylene glycol, cyclohexanone, isopropanol, phthalic acid, and etc. As the precipitator, there can be mentioned ammonia, ammonium bicarbonate, ammonium carbonate, sodium hydroxide, potassium hydroxide, sodium carbonate, and etc.

In order to prepare the slurry, the support, the precursors of vanadium oxides, antimony oxides and oxides of the at least one further component, and optionally, and/or any other additives, such as disperser and precipitator, may be added to the solvent, followed by mixing homogenously. The addition sequence of these ingredients is not particularly limited.

The slurry thus obtained may be subject to shearing, preferably agitating. Application of shearing to the slurry may reduce the particle size of the catalytic particles in the slurry to a desired range. The shearing may be applied in a way known in the art.

Regardless of the type of the support and the preparation method of the SCR catalyst, importantly, it shall be ensured that at least certain amount of the at least one further component, besides vanadium, antimony, is supported on support as the active components. Preferably, a formed support rather than precursor thereof is used in the inventive process.

In step 2) of the inventive process, the slurry is coated onto the monolithic substrate. The coating can be carried out by any method known in the art. For example, the lower end of the substrate may be dipped into the slurry, and vacuum is applied to the upper end of the substrate, so that the slurry is drawn into the passages of the substrate to a desired length.

In step 3) of the inventive process, the coated monolithic substrate is then dried and calcined. In an embodiment of the process, the calcination is conducted under a temperature in the range of 300° C. to 850° C., more preferably in the range of 350° C. to 650° C. After the calcination, the inventive monolithic SCR catalyst can be obtained.

<Monolithic SCR Catalyst Obtainable by the Inventive Process>

The fifth aspect of the present invention relates to a monolithic selective catalytic reduction catalyst obtainable via the process stated above in the fourth aspect.

<Method for Reducing NOx in Exhaust Gas>

The sixth aspect of the present invention relates to a method for reducing NOx in exhaust gas from an internal combustion engine, comprising contacting the exhaust gas with the supported catalyst of the invention, or the monolithic SCR catalyst of the invention, or the monolithic SCR catalyst obtainable via the process of the invention.

In an embodiment of the invention, the exhaust gas is contacted with the catalyst under a temperature in the range of 150° C. to 650° C., or 180 to 600° C., or 200 to 550° C.

The contact of the exhaust gas with the supported catalyst is conducted in the presence of a reductant. The reductant that can be used in the present invention may be any reductants known in the art per se for reducing NOx, for example $NH_3$. $NH_3$ may be derived from urea.

There may be other catalyst upstream or downstream of the present invention, relative to the flow direction of the exhaust gas.

In a preferred embodiment of the invention, the internal combustion engine is a diesel engine.

<Method for Treatment of Emission Gas>

The seventh aspect of the present invention relates to a method for treatment of emission gas generated from power plant, comprising exposing the emission gas to the supported catalyst of the invention, or the monolithic SCR catalyst of the invention, or the monolithic SCR catalyst obtainable via the process of the invention.

EXAMPLES

The following examples are provided to illustrate the invention, but by no means are limitation to the invention.

To compare the micro structure of the inventive supported catalyst with that of a conventional catalyst, Catalyst A and Catalyst B were prepared and subject to XPS analysis.

Catalyst A was synthesized by 92% of $TiO_2$ as a support and $V_2O_5$ (2%), $Sb_2O_3$ (2%), $SiO_2$ (4%) as active components. In a typical synthetic process, 7.4 g antimony acetate was dissolved in 80 g DI water, and then mixed with 36 g vanadyl oxalate solution (11% $V_2O_5$ solid) and 24 g silicic acid (42% $SiO_2$ solid). The mixture was stirred for 30 min, followed by addition of 200 g $TiO_2$ powder. The resulting paste was diluted by DI water. Then the thus-obtained slurry was fast dried followed by calcination at 500° C. for 3 h in air. After cooling to room temperature, Catalyst A was obtained.

The XPS image of Catalyst A is shown in FIG. 1.

Catalyst B was synthesized by 96% of $SiO_2/TiO_2$ (4% $SiO_2$) as a support and $V_2O_5$ (2%), $Sb_2O_3$ (2%) as active components. In a typical synthetic process, 7.4 g antimony acetate was dissolved in 80 g DI water, and then mixed with 36 g vanadyl oxalate solution (11% $V_2O_5$ solid). The mixture was stirred for 30 min, followed by addition of 210 g $SiO_2/TiO_2$ powder. The resulting paste was diluted by DI water. Then the thus-obtained slurry was fast dried followed by calcination at 500° C. for 3 h in air. After cooling to room temperature, Catalyst B was obtained.

Figure 2:
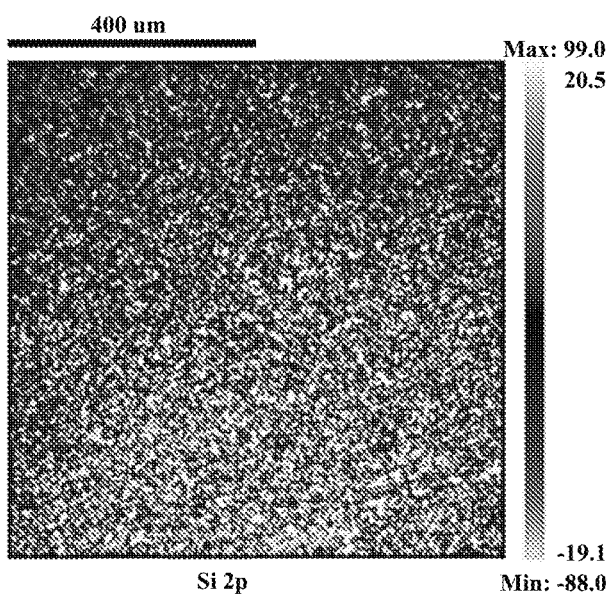
FIG. 2 is an XPS image of the catalyst wherein the support consists of $SiO_2$ and $TiO_2$ and no $SiO_2$ is contained as the active component.

The XPS image of Catalyst B is shown in FIG. 2.

As can be seen from FIGS. 1 and 2, in the inventive catalyst, wherein $SiO_2$ is supported as one of the active components, $SiO_2$ is enriched on the surface and/or at the vicinity of the surface of the support. To the contrary, in Catalyst B, wherein the support consists of $SiO_2$ and $TiO_2$ and no $SiO_2$ is contained as the active component, $SiO_2$ is dispersed relatively uniformly throughout the catalyst.

Example 1

Catalyst 1 was synthesized by coating 92% of $TiO_2$ as a support and $V_2O_5$ (2%), $Sb_2O_3$ (2%), $SiO_2$ (4%) onto a honeycomb cordierite carrier substrate. In a typical synthetic process, 7.4 g antimony acetate was dissolved in 80 g DI water, and then mixed with 36 g vanadyl oxalate solution (11% $V_2O_5$ solid) and 24 g silicic acid (42% $SiO_2$ solid). The mixture was stirred for 30 min, followed by addition of 200 g $TiO_2$ powder. The resulting paste was diluted by DI water. Then the thus-obtained slurry was coated onto a honeycomb cordierite carrier substrate, and fast dried followed by calcination at 500° C. for 3 h in air. After cooling to room temperature, Catalyst 1 was obtained.

Example 2

Catalyst 1 was further calcined at 600° C. (thermal aging) in air for 50 h. After cooling to room temperature, Catalyst 2 was obtained.

Example 3

Catalyst 3 was synthesized by coating containing 79% of $TiO_2$ as a support and $V_2O_5$ (4%), $Sb_2O_3$ (10%), $SiO_2$ (7%) onto a honeycomb cordierite carrier substrate. The synthetic procedure is analogous to that of Catalyst 1 except that the precursor of $SiO_2$ was colloidal silica. After cooling to room temperature, Catalyst 3 was obtained.

Example 4

Catalyst 3 was further calcined at 600° C. (thermal aging) in air for 50 h. After cooling to room temperature, Catalyst 4 was obtained.

Example 5

Catalyst 4 was further aged in sulfur containing atmosphere (10% steam/air with 1000 ppm $SO_2$ for 7 h) at 350° C. (S aging). After cooling to room temperature, Catalyst 5 was obtained.

Example 6

Catalyst 6 was synthesized by coating containing 67% of $TiO_2$ as a support and $V_2O_5$ (7%), $Sb_2O_3$ (16%), $SiO_2$ (10%) onto a honeycomb cordierite carrier substrate. The synthetic procedure is identical to that of Catalyst 3. After cooling to room temperature, Catalyst 6 was obtained.

Example 7

Catalyst 6 was further calcined at 600° C. (thermal aging) in air for 50 h. After cooling to room temperature, Catalyst 7 was obtained.

Example 8

Catalyst 8 was synthesized by coating containing 79% of $SiO_2/TiO_2$ (10% $SiO_2$) as a support and $V_2O_5$ (4%), $Sb_2O_3$ (10%), $SiO_2$ (7%) onto a honeycomb cordierite carrier substrate. The synthetic procedure is identical to that of Catalyst 3. After cooling to room temperature, Catalyst 8 was obtained.

Example 9

Catalyst 9 was synthesized by coating containing 79% of $WO_3/TiO_2$ (10% $WO_3$) as a support and $V_2O_5$ (4%), $Sb_2O_3$ (10%), $SiO_2$ (7%) onto a honeycomb cordierite carrier substrate. The synthetic procedure is identical to that of Catalyst 8. After cooling to room temperature, Catalyst 9 was obtained.

Example 10

Catalyst 10 was synthesized by coating containing 79% of $SiO_2/WO_3/TiO_2$ (9% $WO_3$, 10% $SiO_2$) as a support and $V_2O_5$ (4%), $Sb_2O_3$ (10%), $SiO_2$ (7%) onto a honeycomb cordierite carrier substrate. The synthetic procedure is identical to that of Catalyst 8. After cooling to room temperature, Catalyst 10 was obtained.

Example 11

Catalyst 11 was synthesized by coating containing 79% of $SiO_2$ as a support and $V_2O_5$ (4%), $Sb_2O_3$ (10%), $SiO_2$ (7%) onto a honeycomb cordierite carrier substrate. The synthetic procedure is identical to that of Catalyst 8. After cooling to room temperature, Catalyst 11 was obtained.

Example 12

Catalyst 12 was synthesized by coating containing 79% of $CeO_2$ as a support and $V_2O_5$ (4%), $Sb_2O_3$ (10%), $SiO_2$ (7%) onto a honeycomb cordierite carrier substrate. The synthetic procedure is identical to that of Catalyst 8. After cooling to room temperature, Catalyst 12 was obtained.

Example 13

Catalyst 13 was synthesized by coating containing 79% of $ZrO_2$ as a support and $V_2O_5$ (4%), $Sb_2O_3$ (10%), $SiO_2$ (7%) onto a honeycomb cordierite carrier substrate. The synthetic procedure is identical to that of Catalyst 8. After cooling to room temperature, Catalyst 13 was obtained.

Example 14

Catalyst 14 was synthesized by coating containing 79% of $CeO_2/ZrO_2$ (80% $CeO_2$, 20% $ZrO_2$) as a support and $V_2O_5$ (4%), $Sb_2O_3$ (10%), $SiO_2$ (7%) onto a honeycomb cordierite carrier substrate. The synthetic procedure is identical to that of Catalyst 8. After cooling to room temperature, Catalyst 14 was obtained.

Example 15

Catalyst 15 was synthesized by coating containing 79% of $Al_2O_3$ as a support and $V_2O_5$ (4%), $Sb_2O_3$ (10%), $SiO_2$ (7%) onto a honeycomb cordierite carrier substrate. The synthetic procedure is identical to that of Catalyst 8. After cooling to room temperature, Catalyst 15 was obtained.

Example 16

Catalyst 16 was synthesized by coating containing 79% of $TiO_2$ as a support and $V_2O_5$ (4%), $Sb_2O_3$ (10%), $Al_2O_3$ (7%) onto a honeycomb cordierite carrier substrate. The synthetic procedure is identical to that of Catalyst 3. After cooling to room temperature, Catalyst 16 was obtained.

Example 17

Catalyst 17 was synthesized by coating containing 79% of $TiO_2$ as a support and $V_2O_5$ (4%), $Sb_2O_3$ (10%), $ZrO_2$ (7%) onto a honeycomb cordierite carrier substrate. The synthetic procedure is identical to that of Catalyst 3. After cooling to room temperature, Catalyst 17 was obtained.

Example 18

Catalyst 18 was synthesized by coating containing 79% of $TiO_2$ as a support and $V_2O_5$ (4%), $Sb_2O_3$ (10%), $SiO_2$ (7%) onto a honeycomb cordierite carrier substrate. The synthetic procedure is analogous to that of Catalyst 3 except the precursor of $V_2O_5$ and $Sb_2O_3$ was changed to ammonium metavanadate and ethylene glycol antimony. After cooling to room temperature, Catalyst 18 was obtained.

Example 19

Catalyst 19 was synthesized by coating containing 79% of $TiO_2$ as a support and $V_2O_5$ (4%), $Sb_2O_3$ (10%), $SiO_2$ (7%) onto a honeycomb cordierite carrier substrate. The synthetic procedure is analogous to that of Catalyst 3 except the calcined temperature was changed to 600° C./3 hrs. After cooling to room temperature, Catalyst 19 was obtained.

Example 20

Catalyst 20 was synthesized by coating containing 82% of $TiO_2$ as a support and $V_2O_5$ (4%), $Sb_2O_3$ (7%), $SiO_2$ (7%) onto a honeycomb cordierite carrier substrate. The synthetic procedure is identical to that of Catalyst 3. After cooling to room temperature, Catalyst 20 was obtained.

Example 21

Catalyst 21 was synthesized by coating containing 77% of $TiO_2$ as a support and $V_2O_5$ (4%), $Sb_2O_3$ (12%), $SiO_2$ (7%) onto a honeycomb cordierite carrier substrate. The synthetic procedure is identical to that of Catalyst 3. After cooling to room temperature, Catalyst 21 was obtained.

Example 22 (Comparative Example 1)

Comparative Catalyst 1 was synthesized by coating containing 96% of $TiO_2$ as a support and $V_2O_5$ (2%), $Sb_2O_3$ (2%) onto a honeycomb cordierite carrier substrate. The synthetic procedure is identical to that of Catalyst 1. After cooling to room temperature, Comparative Catalyst 1 was obtained.

Example 23 (Comparative Example 2)

Comparative Catalyst 1 was further calcined at 600° C. (thermal aging) in air for 50 h. After cooling to room temperature, Comparative Catalyst 2 was obtained.

Example 24 (Comparative Example 3)

Comparative Catalyst 3 was synthesized by coating containing 86% of $TiO_2$ as a support and $V_2O_5$ (4%), $Sb_2O_3$ (10%) onto a honeycomb cordierite carrier substrate. The synthetic procedure is identical to that of Catalyst 3. After cooling to room temperature, Comparative Catalyst 3 was obtained.

Example 25 (Comparative Example 4)

Comparative Catalyst 3 was further calcined at 600° C. (thermal aging) in air for 50 h. After cooling to room temperature, Comparative Catalyst 4 was obtained.

Example 26 (Comparative Example 5)

Comparative Catalyst 5 was synthesized by coating containing 77% of $TiO_2$ as a support and $V_2O_5$ (7%), $Sb_2O_3$ (16%) onto a honeycomb cordierite carrier substrate. The synthetic procedure is identical to that of Catalyst 6. After cooling to room temperature, Comparative Catalyst 5 was obtained.

Example 27 (Comparative Example 6)

Comparative Catalyst 5 was further calcined at 600° C. (thermal aging) in air for 50 h. After cooling to room temperature, Comparative Catalyst 6 was obtained.

Example 28

Catalysts 1-21 and Comparative Catalyst 1-6 were tested as Diesel SCR catalysts for NOx reduction. All the catalysts were placed in the fixed lab simulator for testing. 7 g catalyst amount was used in each testing. The feed gas component is: 500 ppm $NH_3$, 500 ppm NO, 10% $H_2O$, 5% $O_2$ and $N_2$. Space velocity is: 60,000 $h^{-1}$. The activity test results are listed in Table 1:

TABLE 1

SCR Activity Comparison

| Sample | NOx Conversoin | | | Aging condition |
|---|---|---|---|---|
| | @200° C. | @225° C. | @250° C. | |
| Catalyst 1 | 21.8 | 36.3 | 53.2 | Fresh |
| Catalyst 2 | 21.6 | 36.5 | 53.5 | Aged |
| Catalyst 3 | 40.6 | 64.6 | 87.1 | Fresh |
| Catalyst 4 | 39.7 | 63.3 | 85.2 | Aged |
| Catalyst 5 | 35.5 | 60.4 | 83.5 | hydrothermal aged + S aged |
| Catalyst 6 | 34.1 | 54.6 | 74.2 | Fresh |
| Catalyst 7 | 15.3 | 21.4 | 33.2 | Aged |
| Catalyst 8 | 20.5 | 46.3 | 63.1 | Fresh |
| Catalyst 9 | 34.4 | 60.6 | 80.1 | Fresh |
| Catalyst 10 | 32.3 | 53.5 | 70.8 | Fresh |
| Catalyst 11 | 12.1 | 20.5 | 25.6 | Fresh |
| Catalyst 12 | 30.1 | 50.3 | 75.6 | Fresh |
| Catalyst 13 | 15.7 | 20.4 | 26.3 | Fresh |
| Catalyst 14 | 32.7 | 58.4 | 81.3 | Fresh |
| Catalyst 15 | 13.3 | 16.5 | 21.7 | Fresh |
| Catalyst 16 | 37.6 | 65.3 | 82.1 | Fresh |
| Catalyst 17 | 26.4 | 47.6 | 73.2 | Fresh |
| Catalyst 18 | 39.7 | 62.5 | 83.6 | Fresh |
| Catalyst 19 | 40.8 | 63.2 | 83.3 | Fresh |
| Catalyst 20 | 41.7 | 65.3 | 84.7 | Fresh |
| Catalyst 21 | 39.5 | 63.4 | 85.6 | Fresh |
| Comparative Catalyst 1 | 13.2 | 30.1 | 47.3 | Fresh |
| Comparative Catalyst 2 | 15.6 | 31.5 | 47.3 | Aged |
| Comparative Catalyst 3 | 27.5 | 46.7 | 70.8 | Fresh |
| Comparative Catalyst 4 | 25.5 | 46.3 | 68.6 | Aged |
| Comparative Catalyst 5 | 33.2 | 52.5 | 73.1 | Fresh |
| Comparative Catalyst 6 | 9.6 | 14.3 | 21.4 | Aged |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What claimed is:

1. A supported catalyst for reducing $NO_x$ in exhaust gas from an internal combustion engine, comprising:
    a support comprises at least one selected from the group consisting of $TiO_2$, $Al_2O_3$, $SiO_2$, $ZrO_2$, $CeO_2$, zeolite, $TiO_2$ and $WO_3$, and combinations thereof, and
    catalytically active components supported on the support, which comprise vanadium, antimony and at least one further component selected from the group consisting of silicon, aluminum and zirconium, wherein the at least one further component is enriched on a surface or at a vicinity of the surface of the support, and wherein, based on the total weight of the support and the catalytically active components, the at least one further component is contained in amount of 0.5% to 20% by weight, calculated as $SiO_2$, $Al_2O_3$ or $ZrO_2$, respectively.

2. The supported catalyst according to claim 1, wherein the support is selected from the group consisting of $TiO_2$—$SiO_2$ (ratio 90:10), $TiO_2$—$WO_3$ (ratio 90:10), $TiO_2$—$WO_3$—$SiO_2$ (81:9:10), and $CeO_2$—$ZrO_2$ (ratio 80:20).

3. The supported catalyst according to claim 1, wherein the support consists of $TiO_2$, $TiO_2$ and $SiO_2$, $TiO_2$ and $WO_3$, or $TiO_2$, $SiO_2$ and $WO_3$.

4. The supported catalyst according to claim 1, wherein the catalytically active components comprise or consist of vanadium, antimony and silicon.

5. The supported catalyst according to claim 1, wherein the catalytically active components consist of vanadium, antimony and aluminum.

6. The supported catalyst according to claim 1, wherein the catalytically active components consist of vanadium, antimony and zirconium.

7. The supported catalyst according to claim 1, wherein the catalytically active components are in the form of oxides of each of vanadium, antimony and the at least one further component, or composite oxides of two or more of vanadium, antimony and the at least one further component.

8. The supported catalyst according to claim 1, consisting of:
    $TiO_2$, as the support, and
    vanadium, antimony and silicon, as the catalytically active components.

9. The supported catalyst according to claim 1, wherein based on the total weight of the support and the catalytically active components, the support is contained in an amount of 50% to 97.5% by weight.

10. The supported catalyst according to claim 1, wherein based on the total weight of the support and the catalytically active components, vanadium is contained in an amount of 1% to 10% by weight, calculated as $V_2O_5$; and antimony is contained in an amount of 1% to 20% by weight, calculated as $Sb_2O_3$.

11. A process for preparing the supported catalyst of claim 1, including the steps of:
    providing the support; and
    supporting the catalytically active components onto the support.

12. The process of claim 11, including the steps of:
    i) providing a solution or a slurry comprising precursors of vanadium oxides, antimony oxides and oxides of the at least one further component selected from the group consisting of silicon, aluminum and zirconium,
    ii) mixing the solution or the slurry with the support to obtain a mixture,
    iii) drying the mixture obtained in step ii), and
    iv) calcining the dried mixture obtained in step iii).

13. The process of claim 12, wherein the calcination is conducted under a temperature in the range of 300° C. to 850° C.

14. The process of claim 12, wherein the precursor of the vanadium oxides is selected from the group consisting of ammonium vanadate, vanadyl oxalate, vanadium pentoxide, vanadium monoethanolamine, vanadium chloride, vanadium trichloride oxide, vanadyl sulfate and vanadium antimonate.

15. The process of claim 12, wherein the precursor of the antimony oxides is selected from the group consisting of antimony acetate, ethylene glycol antimony, antimony sulfate, antimony nitrate, antimony chloride, antimonous sulfide, antimony oxide and antimony vanadate.

16. A monolithic selective catalytic reduction catalyst, comprising:
    a monolithic substrate, and
    a catalytic coating layer on the monolithic substrate, wherein the catalytic coating layer comprises the supported catalyst of claim 1.

17. The monolithic selective catalytic reduction catalyst of claim 16, wherein the monolithic substrate is in the shape of honeycomb, corrugated plate, foils, plate or combination thereof.

18. The monolithic selective catalytic reduction catalyst of claim 16, wherein loading amount of the catalytic coating layer is 1 $g/in^3$-10 $g/in^3$.

19. A process for preparing the monolithic selective catalytic reduction catalyst of claim 16, including the steps of:
    1) providing a slurry comprising particles of the support, precursors of vanadium oxides, antimony oxides and oxides of the at least one further component selected from the group consisting of silicon, aluminum and zirconium,
    2) coating the slurry onto the monolithic substrate to obtain a coated monolithic substrate, and
    3) drying and calcining the coated monolithic substrate obtained in step 2).

20. The process of claim 19, wherein the calcination is conducted under a temperature in the range of 300° C. to 850° C.

21. The process of claim 19, wherein the precursor of the vanadium oxides is selected from the group consisting of ammonium vanadate, vanadyl oxalate, vanadium pentoxide, vanadium monoethanolamine, vanadium chloride, vanadium trichloride oxide, vanadyl sulfate, vanadium antimonate, and antimony vanadate.

22. The process of claim 19, wherein the antimony precursor is selected from the group consisting of antimony acetate, ethylene glycol antimony, antimony sulfate, antimony nitrate, antimony chloride, antimonous sulfide, antimony oxide, vanadium antimonate and antimony vanadate.

23. The process of claim 19, wherein the solvent for the slurry comprises water.

24. The process of claim 19, wherein the solution or slurry further comprises one or more conventional additives, disperser and precipitator.

25. A monolithic selective catalytic reduction catalyst prepared by the process of claim 19.

26. A method for reducing $NO_x$ in exhaust gas from an internal combustion engine, comprising contacting the exhaust gas with the catalyst of claim 1 in the presence of a reductant, preferably $NH_3$.

27. The method of claim 26, wherein the exhaust gas is contacted with the catalyst under a temperature in the range of 150° C. to 650° C.

28. The method of claim 26, wherein the internal combustion engine is a diesel engine.

29. A method for treatment of emission gas generated from power plant, comprising exposing the emission gas to the catalyst of claim 1.

* * * * *